US008488703B2

(12) United States Patent
Wild et al.

(10) Patent No.: US 8,488,703 B2
(45) Date of Patent: Jul. 16, 2013

(54) METHOD FOR DETERMINING MIMO TRANSMISSION TECHNIQUES, BASE STATION AND MOBILE TERMINAL

(75) Inventors: Thorsten Wild, Stuttgart (DE); Cornelis Hoek, Tamm (DE)

(73) Assignee: Alcatel Lucent, Paris (FR)

( * ) Notice: Subject to any disclaimer, the term of this patent is extended or adjusted under 35 U.S.C. 154(b) by 926 days.

(21) Appl. No.: 12/046,392

(22) Filed: Mar. 11, 2008

(65) Prior Publication Data

US 2008/0232502 A1 Sep. 25, 2008

(30) Foreign Application Priority Data

Mar. 21, 2007 (EP) .................................. 07300887

(51) Int. Cl.
*H04B 7/02* (2006.01)
(52) U.S. Cl.
USPC .......................................... 375/267; 375/316
(58) Field of Classification Search
USPC .......................................................... 375/267
See application file for complete search history.

(56) References Cited

U.S. PATENT DOCUMENTS

| 7,181,245 | B2 | 2/2007 | Smith et al. | |
|---|---|---|---|---|
| 2004/0002364 | A1 | 1/2004 | Trikkonen et al. | |
| 2006/0025153 | A1 | 2/2006 | Inaba | |
| 2007/0099578 | A1 | 5/2007 | Adeney et al. | |
| 2007/0225041 | A1* | 9/2007 | Bi et al. | 455/562.1 |
| 2009/0213955 | A1 | 8/2009 | Higuchi et al. | |

FOREIGN PATENT DOCUMENTS

| JP | 2004517549 A | 6/2004 |
|---|---|---|
| JP | 2004194262 A | 7/2004 |
| JP | 2005521358 A | 7/2005 |
| JP | 2006-033207 | 2/2006 |
| WO | WO 02/054626 A1 | 7/2002 |
| WO | WO 03/085876 A1 | 10/2003 |
| WO | WO 2006106613 A1 | 10/2006 |

OTHER PUBLICATIONS

From the EPO—"Communication" dated Jul. 31, 2008 regarding the extended European Search Report, 6 pgs.
From the ISA—"PCT Notification of Transmittal of The International Search Report and the Written Opinion of the ISA, or the Declaration", Date of mailing Jul. 31, 2008, Date of completion of search Jul. 25, 2008, 12 pgs.

(Continued)

*Primary Examiner* — Kenneth Lam
*Assistant Examiner* — Michael Neff
(74) *Attorney, Agent, or Firm* — Fay Sharpe LLP

(57) ABSTRACT

The present invention relates to a method for determining the appropriate combination of at least two MIMO transmission techniques for a radio link in between a transmitter (10) and a receiver (20). The MIMO transmission techniques use at least two antennas (12, 14, 16, 18) with at least two polarizations. According to the invention the appropriate combination is the combination of beamforming and at least one of polarization time coding, closed loop coherent combination of polarization beams and polarization multiplexing. The appropriate combination is chosen dependent on at least one of radio conditions of the radio link (20) and relative velocity in between the transmitter (10) and the receiver (30). The invention further relates to a method for receiving a transmission of a radio link (20) in between a transmitter (10) and a receiver (30). The invention also relates to a base station comprising a transmitter, a mobile terminal comprising a receiver and a communication network.

15 Claims, 2 Drawing Sheets

OTHER PUBLICATIONS

Japanese Office Action, Feb. 2, 2012 (Mailing Date: Feb. 8, 2012), (6 pgs. including a translation).

Das Nirmal Kumar, et al., "Development of a MIMO Experimental System having a Function of Space and Polarization Diversity", IEICE Technical Report, Jul. 23, 2003, vol. 103, No. 233, pp. 133-138, SAT2003-55 (English Abstract Only).

T. Ono, et al., "Adaptive Transmission Power Control for MIMO Diversity Employing Polarization Diversity in OFDM Radio Access", IEICE Technical Report, Jan. 21, 2005, vol. 104, No. 596, pp. 55-60, SAT2004-299 (English Abstract Only).

K. Toshima, et al., "A Consideration on Quasi-Orthogonal MIMO-STBC Transmission System Using Orthogonal Polarized Waves", IEICE Technical Report, Jul. 13, 2005, vol. 105, No. 188, pp. 113-1118, SAT2005-57 (English Abstract Only).

Hui-Chul Won et al., "Improved Channel Estimation for OFDM Systems with Multiple Transmit Antennas over Time-Varying Multipath Fading Channels", IEICE Transactions of Communications, May 2005, vol. E88-B, No. 5, pp. 2093-2101.

* cited by examiner

METHOD FOR DETERMINING MIMO TRANSMISSION TECHNIQUES, BASE STATION AND MOBILE TERMINAL

The invention is based on a priority application EP 07 300 887.2 which is hereby incorporated by reference.

TECHNICAL FIELD

The invention relates to a method for determining the appropriate combination of at least two MIMO (multiple-input multiple-output) transmission techniques for a radio link in between a transmitter and a receiver using at least two antennas with at least two polarizations. The invention also relates to a method for receiving a transmission over a radio link in between a transmitter and a receiver, a base station, a mobile terminal and a communication network.

BACKGROUND OF THE INVENTION

Multiple-input multiple-output (MIMO) transmission refers to the use of multiple antennas both on the transmitter side and on the receiver side. Beamforming is an example of a MIMO technique. In beamforming the same signal is emitted from each of the transmit antennas with appropriate phase weighting such that the signal power is maximized at the receiver output. Sometimes gain weighting is also applied to the signals of each of the transmit antennas.

Space time coding is another example of a MIMO technique. Space time coding is a technique to transmit multiple copies of a data stream across a number of antennas and to exploit the various received versions of the data to improve the reliability of data transfer. For space time coding there exists for example the Alamouti scheme which is originally designed for two transmit antennas. In diversity coding techniques like space time coding a single stream is transmitted in a coded way. The signal is emitted from each of the transmit antennas using certain principles of full or near orthogonal coding. In for example OFDM (orthogonal frequency division multiplex) systems an open loop transmit diversity technique, as e.g. the Alamouti scheme, can be used as space time coding or space frequency coding.

Another known MIMO technique is spatial multiplexing. In spatial multiplexing a data stream is split into multiple streams and each stream is transmitted from a different transmit antenna in the same frequency channel. Therefore the space dimension is re-used or multiplexed more than once. Transmit diversity and spatial multiplexing with per antenna rate control (PARC) is another example of a MIMO technique.

SUMMARY OF THE INVENTION

An object of the invention is to select a combination of MIMO transmission techniques which is well adapted to the prevailing conditions and which is robust and simple. A further object of the invention is to provide a corresponding method for receiving a transmission, a base station, a mobile terminal and a communication network.

These objects and other objects are solved by the features of the independent claims. Features of preferred embodiments of the invention found in the dependent claims.

The invention provides a method for determining an appropriate combination of MIMO transmission techniques for transmission over a radio link in between a transmitter and a receiver using at least two antennas with at least two polarizations. The appropriate combination is a combination of beamforming and one polarization dependent scheme. The method for determining the appropriate combination of MIMO transmission techniques chooses a combination of beamforming and at least one of polarization time coding or polarization frequency coding or closed loop coherent combination of polarization beams or polarization multiplexing. The appropriate combination of MIMO transmission techniques is chosen dependent on at least one of radio conditions of the radio link and relative velocity in between the transmitter and the receiver.

According to a preferred embodiment of the invention the appropriate combination of MIMO transmission techniques is a combination of beamforming and exactly one of polarization time coding or polarization frequency coding or closed loop coherent combination of polarization beams or polarization multiplexing. One scheme chosen is for example a combination of beamforming and polarization time coding or a combination of beamforming and polarization frequency coding. Another possible chosen combination is beamforming in combination with closed loop coherent combination of polarization beams. Another possible combination is the combination of beamforming and polarization multiplexing. The appropriate combination of MIMO transmission techniques is chosen dependent on at least one of radio conditions of the radio link and relative velocity in between the transmitter and the receiver.

According to another preferred embodiment of the invention the appropriate combination of MIMO transmission techniques is a combination of beamforming and more than one of polarization time coding or polarization frequency coding or closed loop coherent combination of polarization beams or polarization multiplexing. A scheme chosen is then for example a combination of beamforming and polarization time coding and one or both of closed loop coherent combination of polarization beam and polarization multiplexing. Another scheme that could be chosen is for example a combination of beamforming and polarization frequency coding and one or both of closed loop coherent combination of polarization beam and polarization multiplexing.

A preferred antenna configuration for applying the method for determining the appropriate combination of at least two MIMO transmission techniques is a configuration where there are four antenna elements in two closely spaced cross-polarized element pairs. The space in between the two element pairs is for example half a wavelength of the radio wave used for the transmission. This antenna configuration fits into one compact radome and offers opportunities in spatial processing. The method of this invention always determines and chooses the appropriate solution for a combination of at least two MIMO transmission techniques. The combination is not fixed but adaptive to the radio conditions of the radio link and/or the relative velocity in between the transmitter and the receiver.

The invention combines two or more of MIMO algorithms depending on the current signal to noise plus interference ratio (SINR) and the velocity of the mobile terminal comprising a receiver. This has the advantage that always the best suitable spatial scheme is chosen by adaptive selection.

According to a preferred embodiment of the invention the information on the radio conditions of the radio link and/or the relative velocity in between the transmitter and the receiver are received at the transmitter. The information on the radio conditions of the radio link and/or the relative velocity in between the transmitter and the receiver preferably depends on the combination of the at least MIMO transmission techniques used for the transmission. According to an embodiment of the invention, the mobile terminal comprising the receiver feeds back the information on the radio conditions, e.g. an SINR estimation. For this feedback of radio conditions on the radio link the channel quality indicator (CQI) feed back values of HSDPA (High-Speed Downlink Packet Access) can for example be used. In addition or alternatively the mobile terminal comprising a receiver feeds back its estimated velocity. The estimation can for example be based on the measured maximum Doppler frequency. If it is assumed that the transmitter is comprised in a base station and that the base station is stationary then the velocity of the mobile terminal comprising in a receiver corresponds to the relative velocity in between the transmitter and the receiver. The feedback of the velocity in between the transmitter and the receiver can be quantized really roughly to save uplink transmission capacity, e.g. by just using one bit for either high speed or low speed. The choice of the quantization of the feedback depends on the chosen thresholds for the velocity. One bit for either high speed or low speed corresponds to just one threshold in between high speed and low speed. Of course the quantization can be chosen to be finer to improve the quality of the determination of the appropriate combination of MIMO transmission techniques. As an alternative, the relative mobile station velocity can also be estimated by evaluation of the uplink signal that is transmitted from the mobile station to the base station.

This would reduce the amount of feedback that is required from the mobile station.

According to a preferred embodiment of the invention, the appropriate combination of MIMO transmission techniques is one of a predefined set of appropriate combinations. According to at least one of the conditions of radio conditions and relative velocity in between the transmitter and the receiver, one of the determined set of appropriate combinations is chosen.

According to a preferred embodiment of the invention the set of appropriate combinations comprises three combinations. One combination is chosen for low SINR and high speed of the receiver. In this case beamforming with space time coding in between the two polarizations is chosen. In this case, beamforming with space frequency coding in between the two polarizations can also be chosen, for example for OFDM systems. Space time coding in between the two polarizations is also called polarization time coding. Space frequency coding in between the two polarizations is also called polarization frequency coding. Another scheme is for example chosen with low SINR and low speed of the receiver. In this case beamforming and transmit diversity is chosen. The transmit diversity combines coherently the two polarizations. The third scheme can for example be chosen when the radio link offers a high SINR. In this case beamforming and spatial multiplexing with one spatial stream per polarization can be chosen. The spatial multiplexing with one spatial stream for polarization is also called polarization multiplexing. The SINR can for example be signaled back from the receiver.

The invention also provides a method for receiving a transmission over a radio link in between a transmitter and a receiver. The receiver sends feedback information on the radio conditions of the radio link and/or the relative velocity in between the transmitter and the receiver back to the transmitter. For the SINR estimation for example the channel quality indicator (CQI) feedback values in HSDPA of UMTS (Universal Mobile Telecommunications System) be used. For feeding back estimated velocity of the receiver the estimation can for example be based on the measured maximum Doppler frequency. The mobile terminal comprising the receiver then measures the maximum Doppler frequency and transmit back this information on the velocity to the transmitter, e.g. in the base station. As an alternative, the relative mobile station velocity can also be estimated by evaluation of the uplink signal that is transmitted from the mobile station to the base station. The feedback of the estimated velocity can be quantized very roughly to save uplink capacity. One quantization can for example be just using one bit for either high speed or low speed with a threshold in between the high speed and the low speed zone. Of course the compensation can be chosen finer to give more accurate estimations on the velocity.

The invention also relates to a transmitter for performing a method for determining the appropriate combination of at least two MIMO transmission techniques and a base station comprising that transmitter.

The invention also relates to a mobile terminal comprising a receiver for performing the method for receiving a transmission over a radio link and for feeding back information on at least one of radio conditions of the radio link and relative velocity in between the transmitter and the receiver.

The invention further relates to a communication network comprising at least one base station for performing the method for determining the appropriate combination of at least two MIMO transmission techniques and preferably also further comprising a mobile terminal comprising a receiver for receiving a transmission over a radio link according to the invention.

BRIEF DESCRIPTION OF THE DRAWINGS

Other characteristics and advantages of the invention will become apparent in the following detailed description of preferred embodiments of the invention illustrated by the accompanying drawings given by way of non-limiting illustrations.

DETAILED DESCRIPTION OF PREFERRED EMBODIMENTS

Figure 1:
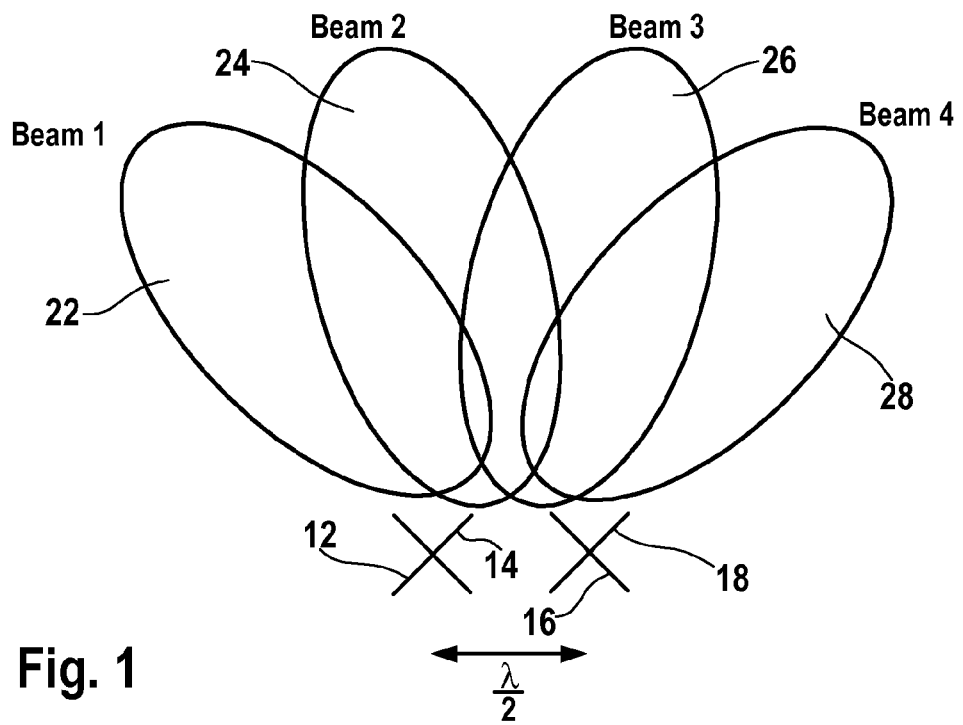
FIG. 1 shows an antenna configuration and beams of one example of one polarization.

FIG. 1 shows an example antenna configuration well adapted to be used with the invention. It shows the configuration of four cross-polarized antenna elements 12, 14, 16, 18. The two pairs with ±45° polarization direction each are separated half a wavelength of spacing. The distance of half a wave length is an advantageous distance but can be chosen differently. Such a configuration fits into one compact radome which eases the deployments while still offering significant MIMO gains in terms of diversity multiplexing and array gains. On each polarization direction a grid of fixed beams can be shaped by proper design of antenna weights of the elements of the corresponding polarization direction. One beam on one polarization direction is called polarization beam for the purpose of this description of the invention. The number of polarization beams can be chosen freely according to needs. One advantageous example is to use four polarization beams on +45° and four polarization beams on −45° polarization. This is a well adapted configuration to achieve a high array gain and low required feedback signaling overhead. In FIG. 1 are shown for example polarization beams 22, 24, 26, and 28 and four antenna elements 12, 14, 16, and 18. The antenna elements 12 and 14 belong to one pair of elements and the antenna elements 16 and 18 belong to a second pair of antenna elements. The pair 12/14 is spaced apart form the pair 16/18 by a distance of half a wave length of the wave length of the radio transmission chosen.

Figure 2:
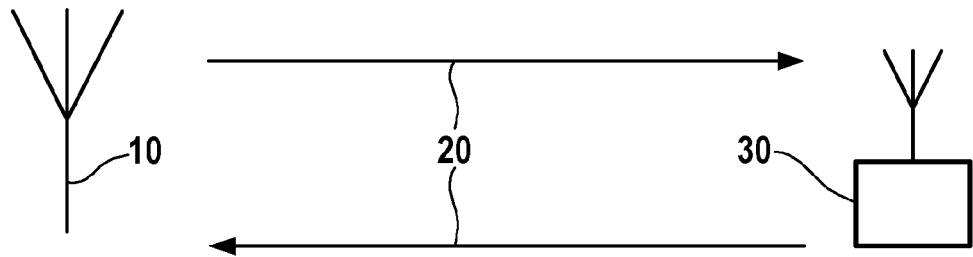
FIG. 2 shows a schematic overview of downlink MIMO transmission and uplink signaling.

FIG. 2 shows a transmitter 10 of a base station and a receiver 30 of a mobile terminal. The radio link 20 in the direction from the transmitter 10 and the receiver 30 is used for downlink MIMO transmission from the transmitter 10 to the receiver 30. The radio link 20 is also used for uplink feedback signaling from the receiver 30 to the transmitter 10. Based on the received power, e.g. received pilot power, on the downlink of the radio link 20 the mobile terminal can calculate its best beam which is the one offering the strongest receive power. The index of the best beam is fed back to the transmitter 10 over the uplink of the radio link 20. The feedback of the index of the best beam can optionally be done on a slow time scale to decrease feedback overhead. This means that fast fading is averaged out. The beam index can be signaled separately per polarization direction. This is advantageous in the case when it follows the fast fading. The beam index can also be signaled back for the average of both polarization directions. This is advantageous when fast fading is averaged out. The type or contents of the feedback required on the uplink of radio link 20 depends on the MIMO transmission scheme applied on the downlink of the radio link 20. The choice in between the two techniques is a performance/overhead trade-off. "Following the fast fading" costs feedback overhead—as feedback information has to be updated more often.

In another embodiment of the invention the selection of polarization beams can also be based on the uplink receive signal instead of the feedback signal. In frequency division duplex systems (FDD) the fading of the uplink and downlink is uncorrelated but the angles of the main propagation path are typically the same. The direction of incoming uplink signals at the transmitter can be estimated by algorithms. Examples for those algorithms are MUSIC (Multiple Signal Classification) or ESPRIT (Estimation of Signal Parameters via Rotational Invariance Techniques). For this embodiment it is advantageous if the pairs of antenna elements are closely spaced, half a wavelength of the applied radio signal apart. The corresponding polarization beams are broadly shaped. Based on estimated uplink directions the beams for downlink transmissions and the corresponding pre-coding weights can be selected.

Figure 3:
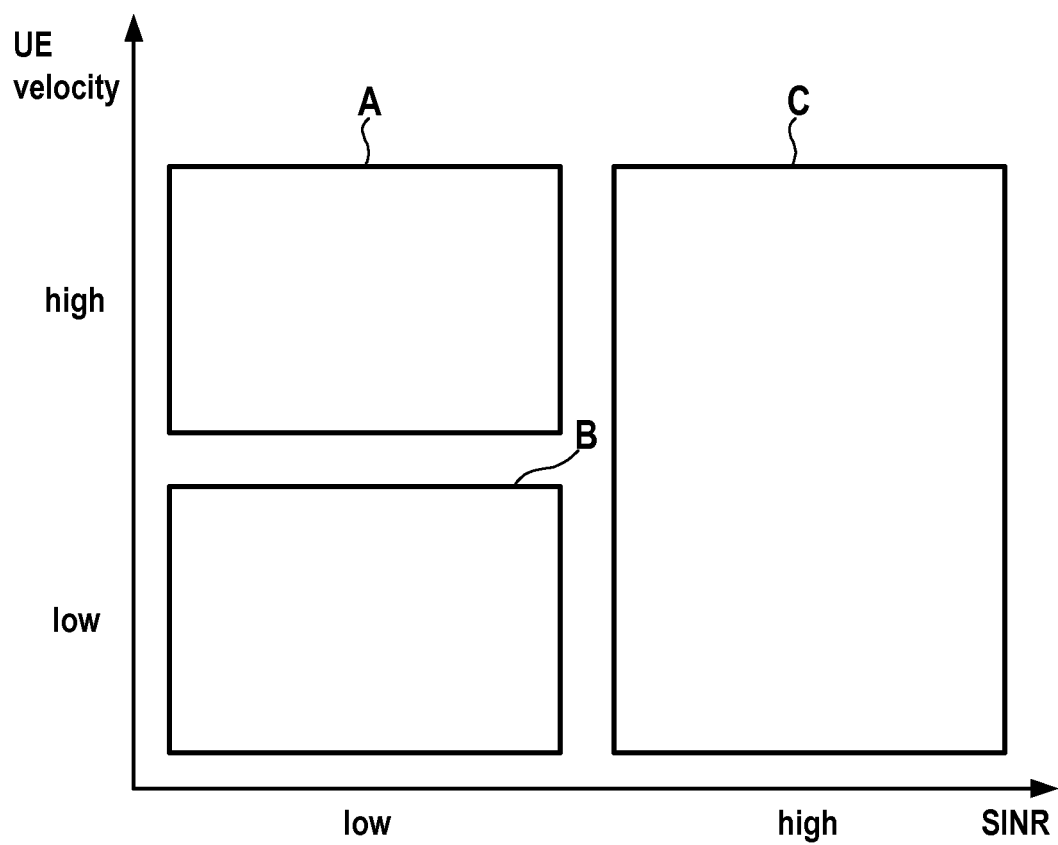
FIG. 3 shows an example of a selection of MIMO schemes based on SINR velocity.

FIG. 3 shows an example of predefined sets of appropriate combinations of at least two MIMO transmission techniques. The selection of shown combinations of MIMO transmission techniques A, B, and C is based on SINR and velocity of the receiver.

The set A is used in the example shown for low SINR and high speed of the receiver. In this case beamforming together with polarization time coding is used. For space time/frequency coding there is a coding scheme called Alamouti scheme. This Alamouti scheme is originally designed for two transmit antennas. According to a preferred embodiment of the invention one polarization beam on +45° polarization direction is used instead of Alamouti antenna 1 and one polarization beam on −45° is used instead for Alamouti antenna 2. Thus beamforming gain can be obtained plus additional diversity gain by Alamouti. The Alamouti coding can for example be mapped to OFDM (orthogonal frequency division multiplex) with space frequency block coding. This scheme can also be called polarization frequency coding.

In this scheme high velocities of the mobile terminal comprising the receiver are tolerated. This scheme therefore requires no additional feedback on the uplink of the radio link 20. The fast fading can be adapted properly as there is no feedback required on the uplink of the radio link 20.

The scheme B shown in FIG. 2 is the case where a set of MIMO transmission techniques is chosen when the SINR is low and the receiver's velocity is low.

According to set B of appropriate combinations of at least two MIMO transmission techniques beamforming is used and the closed loop transmit diversity technique is applied to the polarization beam's concept. The same data is transmitted on the +45° polarization beam and on the −45° polarization beam. Between the two polarization beams a phase shift is applied in order to achieve coherent combining on the receiver's side. For this purpose the mobile sends a quantized phase information using e.g. four bits, which gives the phase shift which maximizes the combined receive power of both beams at the receiver. This phase shift can be calculated at the receiver by using the channel estimates and e.g. testing all possible phase combinations in order to maximize the received signal. Alternatively, for calculating the phase shift code book operation is possible.

Set B of appropriate combinations of MIMO transmission techniques is chosen for low speeds of the receiver, as the phase shift diversity feedback sent uplink on the radio link 20 requires regular updates based on the changes of the fast fading. In set B which is chosen in the case of low SINR and low speed beamforming is therefore combined with closed loop coherent combination of polarization beam. Scheme B benefits from beamforming and diversity gains and additionally gets the coherent combining gain of the closed loop combination of polarization beams.

Set C of appropriate combinations of at least two MIMO transmission techniques is chosen in the case of a high SINR. Scheme C is chosen if the average SINR is high enough. Beamforming in combination with spatial multiplexing will be applied in this case. Spatial multiplexing has the advantage of doubling the maximum throughput by using two independent spatial streams. According to a preferred embodiment of the invention a transmit diversity and spatial multiplexing with per antenna rate control (PARC) is applied to the polarization beams. Data stream 1 will be transmitted on the +45° polarization beam. Data stream 2 will be transmitted on the −45° polarization beam. A SINR information e.g. over CQI information per spatial stream is fed back from the receiver to adapt the modulation and the coding schemes (MCS) on each stream. This inventive concept gives additional beamforming gain. Already existing feedback mechanisms can be used for this set C of appropriate combinations of at least two MIMO transmission techniques. The CQI information per spatial polarization stream is used to adapt the data rates, e.g. modulation order and coding rate, on each polarization stream.

On the downlink of the radio link 20 a MIMO transmission using one of the schemes A, B, or C is performed. On the uplink of the radio link 20 the feedback signaling is performed according to the scheme A, B, or C which is used for the downlink transmission on the radio link 20. The uplink feedback signaling of radio link 20 comprises information on the SINR, signal to interference and noise ratio and/or comprises information on the velocity of the receiver. The velocity information of the receiver comprises at least the information if the velocity is high or low. The feedback signaling on the uplink of the radio link 20 further depends on the MIMO transmission scheme chosen on the downlink of the radio link 20. In the case where the above described schemes A, B, or C are applied the following possibilities exist. When scheme A is applied no additional feedback is necessary. When scheme B is applied, a diversity feedback is transmitted on the uplink of radio link 20. When scheme C is applied, a CQI feedback per polarization stream is fed back on the uplink of the radio link 20. The CQI feedback information gives information on the SINR per polarization stream.

The invention presented is advantageously adapted to cross polarized antenna configurations. An example for an advantageous antenna configuration is the configuration shown in FIG. 1 with 4 antennas 12, 14, 1 6, 18 at the transmitter in the base station in the cross polarized configuration shown in FIG. 1. On the receiver's side at the mobile terminal advantageous results can already be achieved by using two antennas.

The sets of combinations of MIMO transmission techniques cover operational relevant modes to diversity schemes as well as dual stream modes. The selection of the individual schemes is based on the evaluation of SINR and speed at the mobile terminal which comprises the receiver. The concepts presented are applicable to multi user MIMO (MU-MIMO) as well as to single user MIMO (SU-MIMO).

Advantages of several different MIMO techniques are combined to achieve adaptively the proper spatial scheme using polarizations for the current situation present in between transmitter and receiver. This results in increased cell throughput of mobile communication network. The antenna configuration for this invention is compact fitting into a compact radome. The signaling overhead is low at the same time providing gains in the downlink connection.

The invention claimed is:

1. A method for determining an appropriate combination of at least two MIMO transmission techniques for a radio downlink from a base station to a mobile station, the method comprising: using at least two antennas with at least two polarizations, wherein said appropriate combination is a combination of beamforming and at least one of polarization-time-coding, polarization-frequency-coding, closed-loop coherent combination of polarization beams and polarization multiplexing, and said appropriate combination is chosen dependent on radio conditions of the radio downlink and relative velocity in between the base station and the mobile station;
    wherein the appropriate combination includes:
        a combination of beamforming with polarization time coding when signal to noise plus interference ratio (SINR) is below an SINR threshold and a receiver is moving at a speed above a chosen threshold;
        a combination of beamforming and a closed loop transmit diversity technique when the SINR is below the SINR threshold and receiver velocity is below the chosen threshold; and
        a combination of beamforming and spatial multiplexing when the SINR is above the SINR threshold, without regard to receiver velocity.

2. The method according to claim 1, further comprising receiving feedback information on at least one of radio conditions of the radio downlink and relative velocity in between the base station and the mobile station.

3. The method according to claim 2, wherein the received feedback information comprises further information, said further information depending on the chosen appropriate combination of the at least two MIMO transmission techniques.

4. The method according to claim 1, whereby said appropriate combination being one of a set of appropriate combinations.

5. The method according to claim 4, wherein one of the set of appropriate combinations is beamforming in combination with polarization-time-coding.

6. The method according to claim 4, wherein one of the set of appropriate combinations is beamforming in combination with closed-loop coherent combination of polarization beams.

7. The method according to claim 4, wherein one of the set of appropriate combinations is beamforming in combination with polarization multiplexing.

8. A base station comprising a transmitter for performing the method according to claim 1.

9. A method for receiving a transmission over a radio downlink from a base station to a mobile station, the method comprising: the transmission being performed according to an appropriate combination of at least two MIMO transmission techniques, using at least two antennas with at least two polarizations, said appropriate combination is chosen dependent on radio conditions of the radio downlink and relative velocity between the base station and the mobile station;
    wherein the appropriate combination includes:
        a combination of beamforming with polarization time coding when signal to noise plus interference ratio (SINR) is below an SINR threshold and a receiver is moving at a speed above a chosen threshold;
        a combination of beamforming and a closed loop transmit diversity technique when the SINR is below the SINR threshold and receiver velocity is below the chosen threshold; and
        a combination of beamforming and spatial multiplexing when the SINR is above the SINR threshold, without regard to receiver velocity.

10. The method according to claim 9, the method comprising transmitting feedback information on at least one of radio conditions of the radio downlink and relative velocity in between the base station and the mobile station.

11. The method according to claim 9, further comprising measuring the relative velocity in between the base station and the mobile station.

12. The method according to claim 10, wherein the transmitted feedback information comprises further information, said further information depending on the appropriate combination of the at least two MIMO transmission techniques.

13. A mobile terminal comprising a receiver for performing the method according to claim 9.

14. A communication network comprising at least one base station according to claim 8.

15. The communication network according to claim 14, wherein said receiver is contained in a mobile terminal.

* * * * *